(12) United States Patent
Lee et al.

(10) Patent No.: US 7,973,856 B2
(45) Date of Patent: Jul. 5, 2011

(54) IMAGE-SNAPPING DEVICE

(75) Inventors: Shih-Yun Lee, Taipei Shien (TW); Ching-Cheng Wang, Taoyuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 686 days.

(21) Appl. No.: 12/081,741

(22) Filed: Apr. 21, 2008

(65) Prior Publication Data

US 2009/0231484 A1 Sep. 17, 2009

(30) Foreign Application Priority Data

Mar. 11, 2008 (TW) ................................ 97108544 A

(51) Int. Cl.
*H04N 5/225* (2006.01)
*G03B 17/00* (2006.01)
(52) U.S. Cl. .................... 348/375; 396/428; D16/242
(58) Field of Classification Search ................ D16/242, D16/243, 244, 245
See application file for complete search history.

(56) References Cited

U.S. PATENT DOCUMENTS

| 6,177,950 | B1 * | 1/2001 | Robb | 348/14.01 |
|---|---|---|---|---|
| 6,229,569 | B1 * | 5/2001 | Saito et al. | 348/362 |
| 7,061,536 | B2 * | 6/2006 | Cha | 348/376 |
| 7,146,200 | B2 * | 12/2006 | Park et al. | 455/575.3 |
| 7,246,955 | B2 * | 7/2007 | Cho et al. | 396/349 |
| 7,362,513 | B2 * | 4/2008 | Kim et al. | 359/704 |
| 7,764,320 | B1 * | 7/2010 | Salvato | 348/344 |
| 2003/0164895 | A1 * | 9/2003 | Viinikanoja et al. | 348/375 |
| 2007/0154209 | A1 * | 7/2007 | Chang | 396/544 |
| 2007/0216774 | A1 * | 9/2007 | Shin | 348/207.99 |
| 2009/0181729 | A1 * | 7/2009 | Griffin et al. | 455/575.1 |

* cited by examiner

*Primary Examiner* — Justin P Misleh
(74) *Attorney, Agent, or Firm* — Rabin & Berdo, PC

(57) ABSTRACT

An image snapping device includes a body, a support rod, an image-snapping module and an outer hollow cylinder. The support rod is pivotally connected to the body. The image-snapping module is pivotally connected to the support rod and has a camera rotatable relative to the support rod. The outer hollow cylinder houses the image snapping module and is rotatably connected with the image snapping module, wherein the outer hollow cylinder has multiple lenses, one of which the camera is selectively aligned with.

13 Claims, 3 Drawing Sheets

IMAGE-SNAPPING DEVICE

RELATED APPLICATIONS

This application claims priority to Taiwan Application Serial Number 97108544, filed Mar. 11, 2008, which is herein incorporated by reference.

BACKGROUND

1. Field of Invention

The present invention relates to an image-snapping device.

2. Description of Related Art

Part of notebook computers in the market are equipped with an image-snapping device, but most of the image-snapping devices are designed as a web camera and installed directly at a top edge of a display portion to snap an image in front of the notebook computer. When the image-snapping device is intended for the other applications, the present physical configuration cannot satisfy the demand and needs to be improved.

SUMMARY

It is therefore an objective of the present invention to provide an improved physical configuration of an image-snapping device.

In accordance with the foregoing and other objectives of the present invention, an image snapping device includes a body, a support rod, an image-snapping module and an outer hollow cylinder. The support rod is pivotally connected to the body. The image-snapping module is pivotally connected to the support rod and has a camera rotatable relative to the support rod. The outer hollow cylinder houses the image snapping module and is rotatably connected with the image snapping module, wherein the outer hollow cylinder has multiple lenses, one of which the camera is selectively aligned with.

In accordance with the foregoing and other objectives of the present invention, an electronic device includes a main body portion, a display portion, a support rod, an image-snapping module and an outer hollow cylinder. The display portion is pivotally connected with the main body portion and rotatable relative to the main body portion such that the display portion is capable of being folded against or unfolded away from the main body portion. The support rod is pivotally connected to the display portion. The image-snapping module is pivotally connected to the support rod and has a camera rotatable relative to the support rod. The outer hollow cylinder houses the image snapping module and is rotatably connected with the image snapping module, wherein the outer hollow cylinder has multiple lenses, one of which the camera is selectively aligned with.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
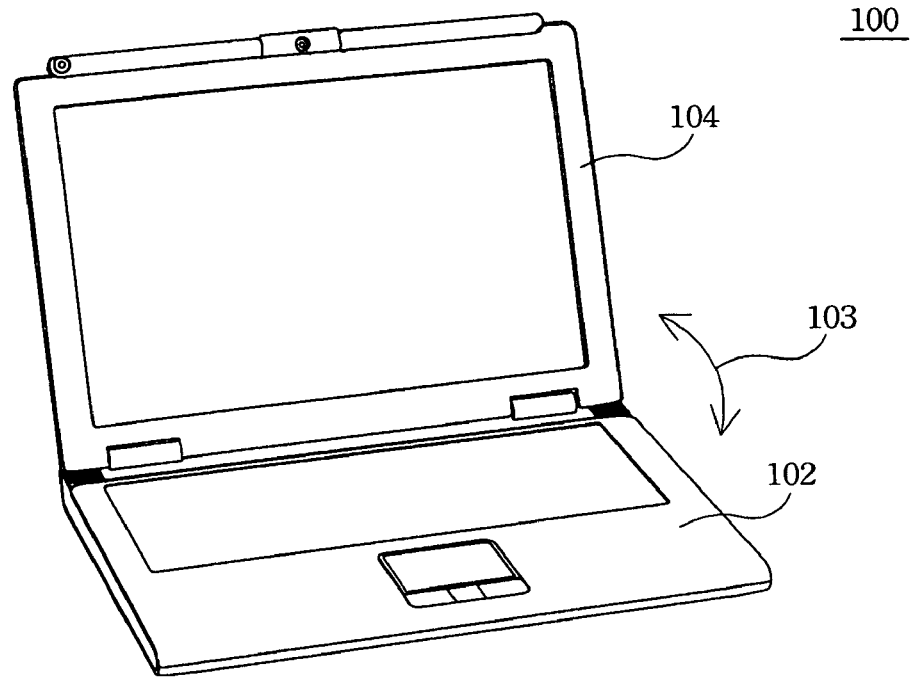
FIGS. 1-3 illustrate a series of operation status of an electronic device according to one preferred embodiment of this invention.

Reference will now be made in detail to the present preferred embodiments of the invention, examples of which are illustrated in the drawings. Wherever possible, the same reference numbers are used in the drawings and the description to refer to the same or like parts.

Figure 2:
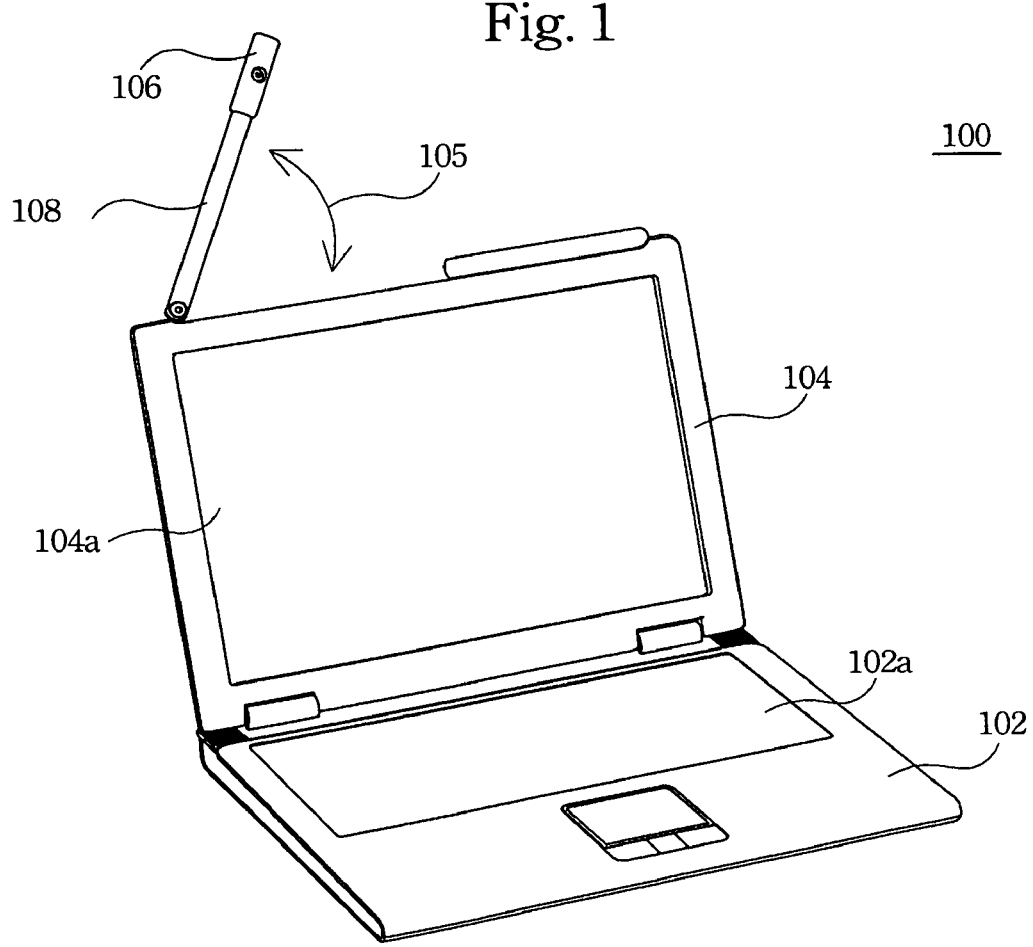
Figure 3:
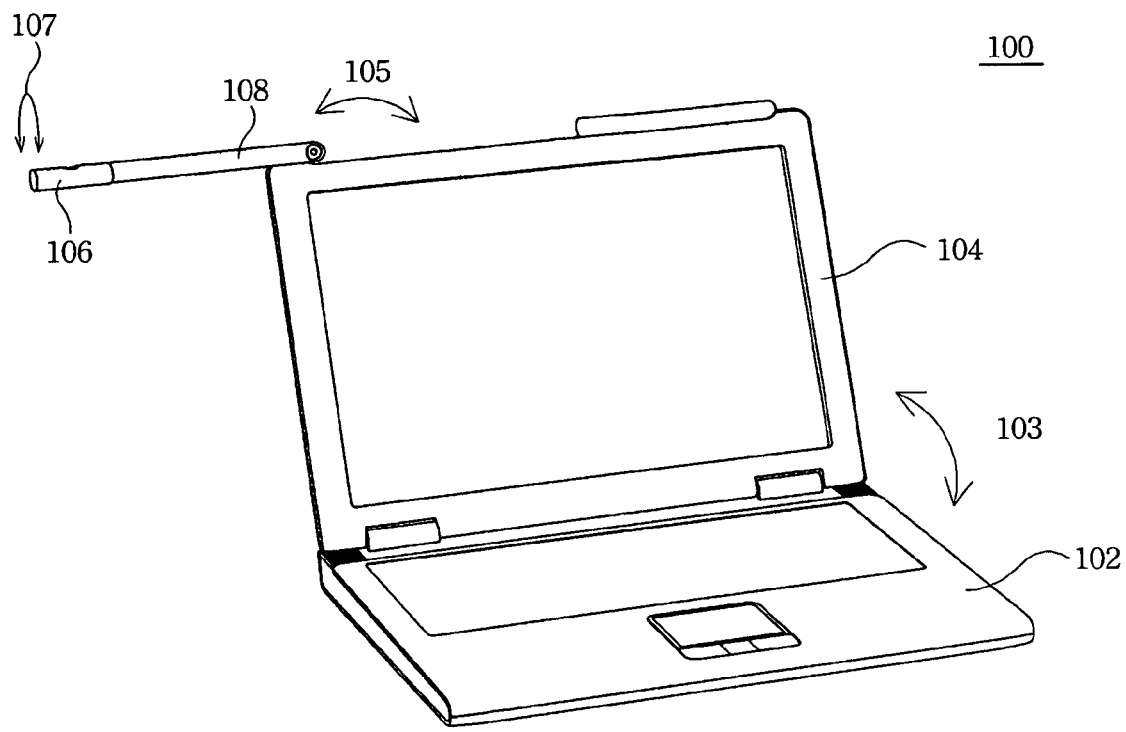

FIGS. 1-3 illustrate a series of operation status of an electronic device or an image-snapping device according to one preferred embodiment of this invention. The electronic device or image-snapping device 100's body includes a main body portion 102 and a display portion 104. The display portion 104 is pivotally connected with the main body portion 102 such that the display portion 104 is rotatable along a direction 103 to be folded against or unfolded away from the main body portion 102 (referring to FIG. 1). The main body portion 102 has a keyboard, by which users input information, on its top surface. The display portion 104 has a display screen 104a to output visible information. An image-snapping module 106 is located at a free end of a support rod 108. An opposite end of the support rod 108 is pivotally connected with a top edge of the display portion 104. A bottom edge (top edge's opposite edge) of the display portion 104 is pivotally connected with the main body portion 102. The support rod 108 is rotatable along a direction 105 to be laid against or away from the top edge of the display portion 104 (referring to FIG. 2). The image-snapping module 106 is also rotatably connected with the free end of the support rod 108 such that the image-snapping module 106 is rotatable along a direction 107 (referring to FIG. 3). Accordingly, the image-snapping module 106 has multiple rotation degrees to be readily used in all types of applications.

Figure 4:
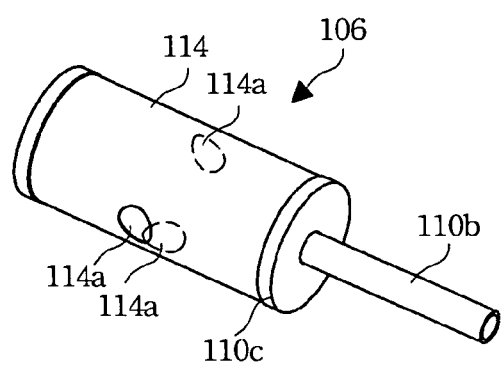
FIG. 4 illustrates an image-snapping module according to one preferred embodiment of this invention.

FIG. 4 illustrates an image-snapping module according to one preferred embodiment of this invention. The image-snapping module 106 includes a outer hollow cylinder 114 and a rotation shaft 110b, wherein the rotation shaft 110b is secured to the support rod 108. The outer hollow cylinder 114 houses the image-snapping module 106 and is rotatably connected with the image-snapping module 106 such that the outer hollow cylinder 114 is rotatable relative to the disc member 110c. The outer hollow cylinder 114 has multiple lenses 114a. The outer hollow cylinder 114 and the disc member 110c are also both rotatable relative to the rotation shaft 110b.

Figure 5:
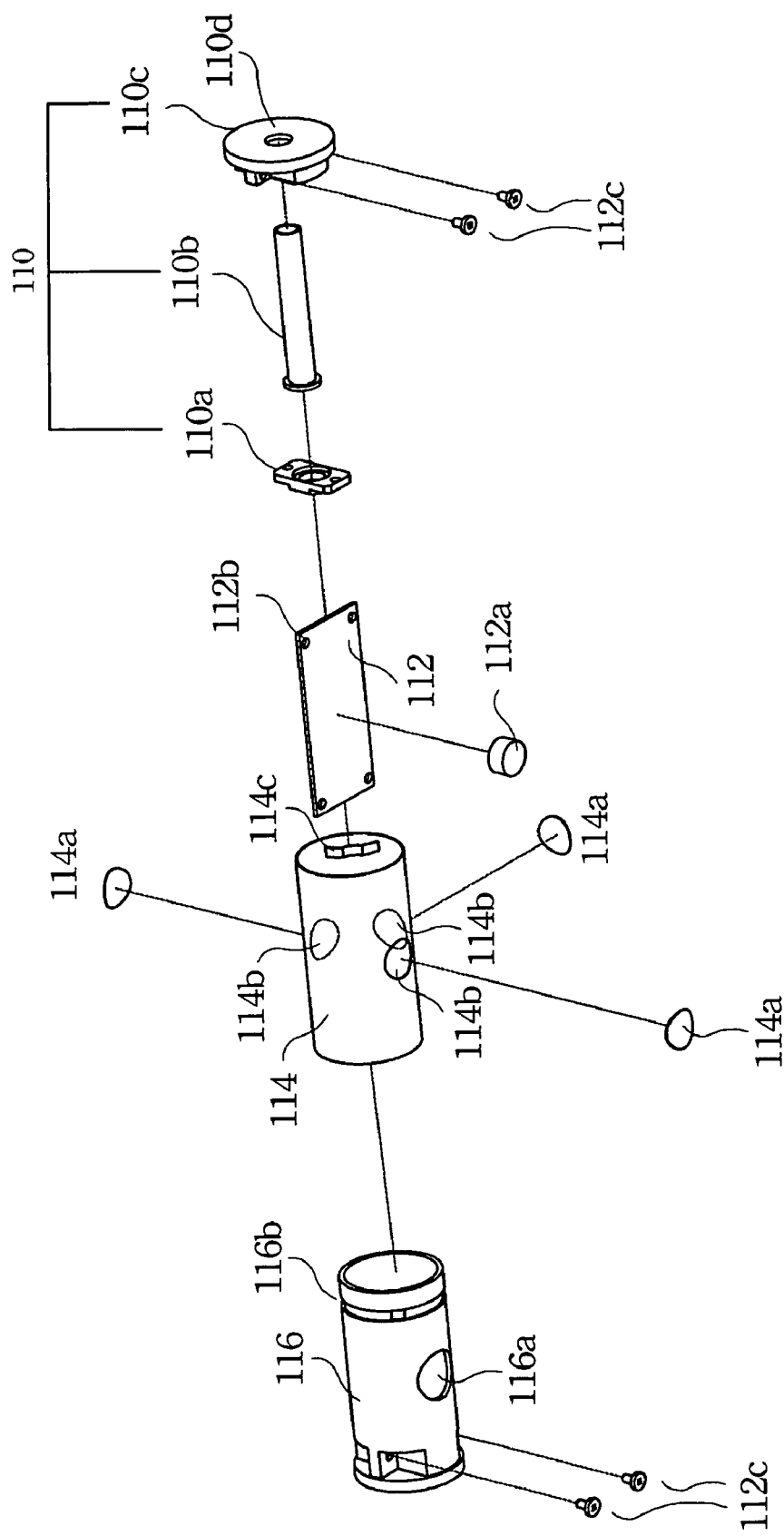
FIG. 5 illustrates an exploded view of the image-snapping module in FIG. 4.

FIG. 5 illustrates an exploded view of the image-snapping module in FIG. 4. The image-snapping module 106 mainly includes a hinge module 110, a circuit board 112, an outer hollow cylinder 114 and an inner hollow cylinder 116.

The hinge module 110 includes a disc member 110c, a rotation shaft 110b and a fastener 110a. The rotation shaft 110b is led through an opening 110d of the disc member 110c, the fastener 110a is then used to secure the rotation shaft 110b to the disc member 110c such that the rotation shaft 110b is rotatable relative to the disc member 110c. As the rotation shaft 110b is secured to the support rod 108, the image-snapping module 106 is rotatable relative to the support rod 108 by means of the hinge module 110.

The circuit board 112, which has a camera 112a (such as a CCD or CMOS image sensor), has its opposite edges respectively secured to the disc member 110c and the inner hollow cylinder 116 by using bolts 112c screwed through holes 112b and into screw holes.

The inner hollow cylinder 116 has an opening 116a to be aligned with the camera 112a (in order to expose the camera 112a when all components of the image-snapping module 106 are assembled) such that the camera 112a is able to snap images through the opening 116a. The inner hollow cylinder 116 has a round rail 116b on its outer wall to be connected with the outer hollow cylinder 114.

The outer hollow cylinder 114 houses the inner hollow cylinder 116 and is rotatably connected with the inner hollow cylinder 116. The outer hollow cylinder 114 has a resilient member 114c on its inner wall to engage the round rail 116b of the inner hollow cylinder 116. The round rail 116b has convex or concave members inside to interact with the resilient member 114c of the outer hollow cylinder 114 such that the opening 116a can be aligned with one of the multiple lenses 114a of the outer hollow cylinder 114. All lenses 114a are respectively located within all openings 114b. The lenses 114a include a transparent lens, an opaque lens and a filter lens (such as infrared filter). When the image-snapping module 106 is used as a web camera, the transparent lens may be aligned with opening 116a of the inner hollow cylinder 116. When the image-snapping module 106 is idle, the opaque lens may be aligned with opening 116a of the inner hollow cylinder 116 for anti-dust and protecting the camera 112a. When the image-snapping module 106 is used for other purposes, the filter lens may be aligned with opening 116a of the inner hollow cylinder 116.

According to discussed embodiments, the image-snapping module is pivotally connected with a computer's body portion by multiple hinges and thus has multiple rotation degrees to be readily used in all types of applications. Besides, the image-snapping module has an outer hollow cylinder rotatably connected thereof, wherein the outer hollow cylinder has multiple lenses, one of which the camera can be selectively aligned with for a desired purpose.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An image snapping device, comprising:
a body;
a support rod, pivotally connected to the body;
an image-snapping module, pivotally connected to the support rod, and having a camera being rotatable relative to the support rod; and
an outer hollow cylinder, housing and being rotatably connected with the image snapping module, the outer hollow cylinder having multiple lenses, one of which the camera being selectively aligned with,
wherein the image-snapping module comprises an inner hollow cylinder, with which the outer hollow cylinder is rotatably connected; and
wherein the inner hollow cylinder comprises a round rail, and the outer hollow cylinder comprises a resilient member on its inner wall to engage the round rail, whereby the camera is selectively aligned with one of the multiple lenses.

2. The image snapping device of claim 1, wherein the lenses comprise a transparent lens, an opaque lens and a filter lens.

3. The image snapping device of claim 1, wherein the image-snapping module is disposed at a free end of the support rod.

4. The image snapping device of claim 1, wherein the camera comprises a CCD or CMOS image sensor.

5. The image snapping device of claim 1, wherein the inner hollow cylinder comprises an opening to expose the camera.

6. An electronic device, comprising:
a main body portion;
a display portion, being pivotally connected with the main body portion and rotatable relative to the main body portion such that the display portion is capable of being folded against or unfolded away from the main body portion;
a support rod, pivotally connected to the display portion;
an image-snapping module, pivotally connected to the support rod and having a camera being rotatable relative to the support rod; and
an outer hollow cylinder, housing and being rotatably connected with the image snapping module, the outer hollow cylinder having multiple lenses, one of which the camera being selectively aligned with,
wherein the image-snapping module comprises an inner hollow cylinder, with which the outer hollow cylinder is rotatably connected; and
wherein the inner hollow cylinder comprises a round rail, and the outer hollow cylinder comprises a resilient member on its inner wall to engage the round rail, whereby the camera is selectively aligned with one of the multiple lenses.

7. The electronic device of claim 6, wherein the lenses comprise a transparent lens, an opaque lens and a filter lens.

8. The electronic device of claim 6, wherein the image-snapping module is disposed at a free end of the support rod.

9. The electronic device of claim 6, wherein the camera comprises a CCD or CMOS image sensor.

10. The electronic device of claim 6, wherein the display portion comprises a display screen.

11. The electronic device of claim 6, wherein the support rod is pivotally connected to an edge of the display portion, whose opposite edge is pivotally connected to the main body portion.

12. The electronic device of claim 6, wherein the main body portion comprises a keyboard.

13. The electronic device of claim 6, wherein the inner hollow cylinder comprises an opening to expose the camera.

* * * * *